(12) United States Patent
Karakawa

(10) Patent No.: US 6,304,237 B1
(45) Date of Patent: Oct. 16, 2001

(54) MONOCHROMATIC R,G,B LASER LIGHT SOURCE DISPLAY SYSTEM AND METHOD

(75) Inventor: Masayuki Karakawa, Marlborough, MA (US)

(73) Assignee: Corporation for Laser Optics Research, Portsmouth, NH (US)

( * ) Notice: Subject to any disclaimer, the term of this patent is extended or adjusted under 35 U.S.C. 154(b) by 0 days.

(21) Appl. No.: 09/319,058

(22) PCT Filed: Nov. 28, 1997

(86) PCT No.: PCT/US97/22066

§ 371 Date: May 27, 1999

§ 102(e) Date: May 27, 1999

(87) PCT Pub. No.: WO98/26328

PCT Pub. Date: Jun. 18, 1998

Related U.S. Application Data (60) Provisional application No. 60/032,269, filed on Nov. 29, 1996.

(51) Int. Cl.[7] .................................................. G09G 3/34
(52) U.S. Cl. .................................. 345/84; 345/83; 372/22
(58) Field of Search .................................. 345/85, 32, 84, 345/102, 88, 139, 153, 44, 46, 39, 82, 83; 359/621, 619; 372/22, 23, 26, 31; 353/31; 348/661, 760

(56) References Cited

U.S. PATENT DOCUMENTS

| | | |
|---|---|---|
| 3,514,534 | 5/1970 | Korpel . |
| 4,611,245 | 9/1986 | Trias . |
| 4,653,056 | 3/1987 | Baer . |
| 4,656,635 | 4/1987 | Baer . |
| 4,701,929 | 10/1987 | Baer . |
| 4,833,528 | 5/1989 | Kobayashi . |
| 4,978,202 | 12/1990 | Yang . |
| 5,029,975 | 7/1991 | Pease . |
| 5,136,599 * | 8/1992 | Wilcox ................................... 372/26 |
| 5,170,156 | 12/1992 | DeMond et al. . |
| 5,307,088 * | 4/1994 | Inuzuka et al. ....................... 345/153 |
| 5,307,359 | 4/1994 | Sarraf . |
| 5,317,348 | 5/1994 | Knize . |
| 5,388,114 | 2/1995 | Zarrabi et al. . |
| 5,434,875 | 7/1995 | Rieger et al. . |
| 5,440,352 | 8/1995 | Deter et al. . |
| 5,485,225 | 1/1996 | Deter et al. . |
| 5,504,602 | 4/1996 | Farmer . |
| 5,802,086 * | 9/1998 | Hargis et al. ........................... 372/22 |
| 5,828,424 * | 10/1998 | Wallenstein ........................... 348/760 |
| 6,025,885 * | 2/2000 | Deter ................................... 348/661 |

FOREIGN PATENT DOCUMENTS

PCT/US95/
00581    8/1995   (WO) .

* cited by examiner

*Primary Examiner*—Chanh Nguyen
(74) *Attorney, Agent, or Firm*—Ropes & Gray (57) ABSTRACT

A monochromatic red (R), green (G), blue (B) pulsed laser light source (FIG. 2) for use in a full color video/image display system particularly an LCD display system (FIG. 3), the light source generating R,G,B laser beams with minimum speckle noise, and having digital color space conversion incorporated within.

28 Claims, 5 Drawing Sheets

MONOCHROMATIC R,G,B LASER LIGHT SOURCE DISPLAY SYSTEM AND METHOD

REFERENCE TO PRIOR APPLICATION

This application claims the benefit of U.S. Provisional Patent Application Serial No. 60/032,269, filed Nov. 29, 1996, and is hereby incorporated by reference.

BACKGROUND OF THE INVENTION

A monochromatic red (R), green (G), and blue (B) light source having well color balanced white light output is a very desirable light source for many display applications, because it is known to be more efficient compared to other conventional incoherent "white light" light sources with red, green and blue filters. For example, used in conjunction with 3 channel, transmissive Liquid Crystal Display (LCD) panel modulator based projection display systems, the monochromatic R,G,B light source producing well color balanced white light can achieve at least 4 times higher optical efficiency than conventional high intensity incoherent light sources, such as Xenon lamps or Metal Halide lamps with red, green and blue filters.

However, the monochromatic R,G,B light source has to originate from some sort of lasers producing a visible spectrum of red, green and blue. As a result, all the past attempts to develop such light sources have had the following shortcomings.

1. Use of some sort of gas lasers as light sources. This results in unacceptably low wall plug efficiency and constant need of laser maintenance.

2. Some of the 3 primary wavelengths generated by the R,G,B laser light sources may not be suited for display use.

3. Some spatial light modulators used in display applications work well with continuous wave (cw) R,G,B laser light sources. The others need pulsed R,G,B laser light sources. It has been known to be very difficult to generate suitable R,G,B colors efficiently from cw laser designs, and pulsed laser light sources in the past have not been suited to couple with spatial light modulators, which require cw light sources, due to unacceptable long pulse duration.

4. The final problem associated with past R,G,B laser light sources is laser speckle, this phenomenon is considered to be a random interference pattern of intensity, which results from the reflection or transmission of highly coherent light from (or through) an optically rough surface (one whose local irregularities in depth are greater than one quarter of a wavelength from a laser light source). The speckle is very annoying to look at, and past attempts employed to minimize the speckle have been to vibrate the screens to disturb phase coherency associated with each wavefront.

SUMMARY OF THE INVENTION

The invention relates to a monochromatic, pulsed laser light source system; display systems employing the light source; and the method of providing the light source and displays.

The invention comprises a monochromatic R,G,B pulsed laser light source adapted for display applications, and particularly, LCD display systems. The light source includes a single or multiple laser master oscillator with a laser medium, for example, a neodymium (Nd)-containing laser medium, particularly, $Nd:YVO_4$ neodymium yttrium vanadate, to provide a pulsed, signal wave laser radiation, e.g., of about 1342 nm, 1047 nm arid 1064 nm and selected pulse width and pulse rate, and single or multiple laser power amplifier to amplify the power of the laser radiation. The light source includes single or multiple, preferably all solid state, non-linear frequency converters to receive and convert the amplified signal wave laser radiation to produce a green wavelength, e.g., about 532 nm or 523.5 nm; with slight spatial incoherency to reduce speckle, red wave length, e.g., about 626 nm to 629 nm with narrow spectrum incoherency to reduce speckle; and blue wave length, e.g., about 447 nm to 452 nm, which R,G,B wavelengths are particularly useful for color display purposes, such as when the light source is coupled with, and used in a three LCD display system, as hereinafter described.

The invention comprises a method by which speckle noise resulted from pulsed lasers may be reduced. Laser light produces a speckle noise, since it is so coherent. Speckle noise is reduced when R,G,B pulsed lasers are used as a light source, by introducing spatial incoherency in green light, by multimode operation and producing spectrum incoherency in red, which in combination reduces speckle noise.

Pulsed operation of the R,G,B laser light source is important, since pulsed operation permits the use of various non-linear frequency conversion processes, such as Optical Parametric Oscillation (OPO) and Sum of Frequency Mix (SFM) to produce visible wavelengths from the fundamental laser radiation of 1064 nm.

The invention includes display systems employing the monochromatic, pulsed laser light source, particularly for LCD display systems, since LCD panel (one of spatial light modulators) does not require pulse width modulation, the R,G,B pulsed laser light source may be coupled to three LCD panels (one panel for each primary color) to create a display system.

The invention presents a monochromatic R,G,B light source which incorporates:

a. solid state laser design which produces very high electrical to optical efficiency;

b. digital color space conversion electronics which transfers input video signal color space into R,G,B color space created by the monochromatic R,G,B light source, so that the resulting color spectrum is acceptable for display use;

c. a laser cavity design that operates at high pulse repetition rate (40–80 kHz range) and produces very short pulse (FWHM~7 ns range), or another design that operates at very high pulse repetition rate (>>1 MHz range) and produces ultra short pulse width (FWHM~100 ps range) with active modelock mechanism, which allows this monochromatic R,G,B light source to be coupled with many different spatial light modulators, which requires R,G,B light source that operates in cw or quasi-cw mode; and d. a green laser design which produces multi-mode laser radiation ($M^2$~10). The multi-mode operation of the laser helps increase the spatial incoherency, thus, reducing the speckle effect.

The invention will be described for the purposes of illustration only in connection with certain illustrated embodiments; however, it is recognized that those persons skilled in the art may make various additions, improvements, modifications and changes to the illustrated embodiments, without departing from the spirit and scope thereof.

DESCRIPTION OF THE EMBODIMENTS

The performance goals of the monochromatic R,G,B laser light source are usually defined by the requirement for pulse repetition rate and FWHM (full-width half-max) pulse width, as well as producing high luminosity, well color-balanced white light when R,G,B laser light are mixed together. The monochromatic R,G,B laser light source incorporates cw diode laser bar pumped, 100% solid state R,G,B pulsed laser design, which produces wavelength of approximately 628 nm (R), 532 nm (G) and 452 nm (B). This monochromatic R,G,B laser light source employs 1064 nm transition in Nd:YVO$_4$ as the fundamental laser radiation, and multi-stage Master Oscillator/Power Amplifier (MOPA) configuration is envisioned to achieve both very short pulse width and high average power at high pulse repetition rate.

Figure 1:
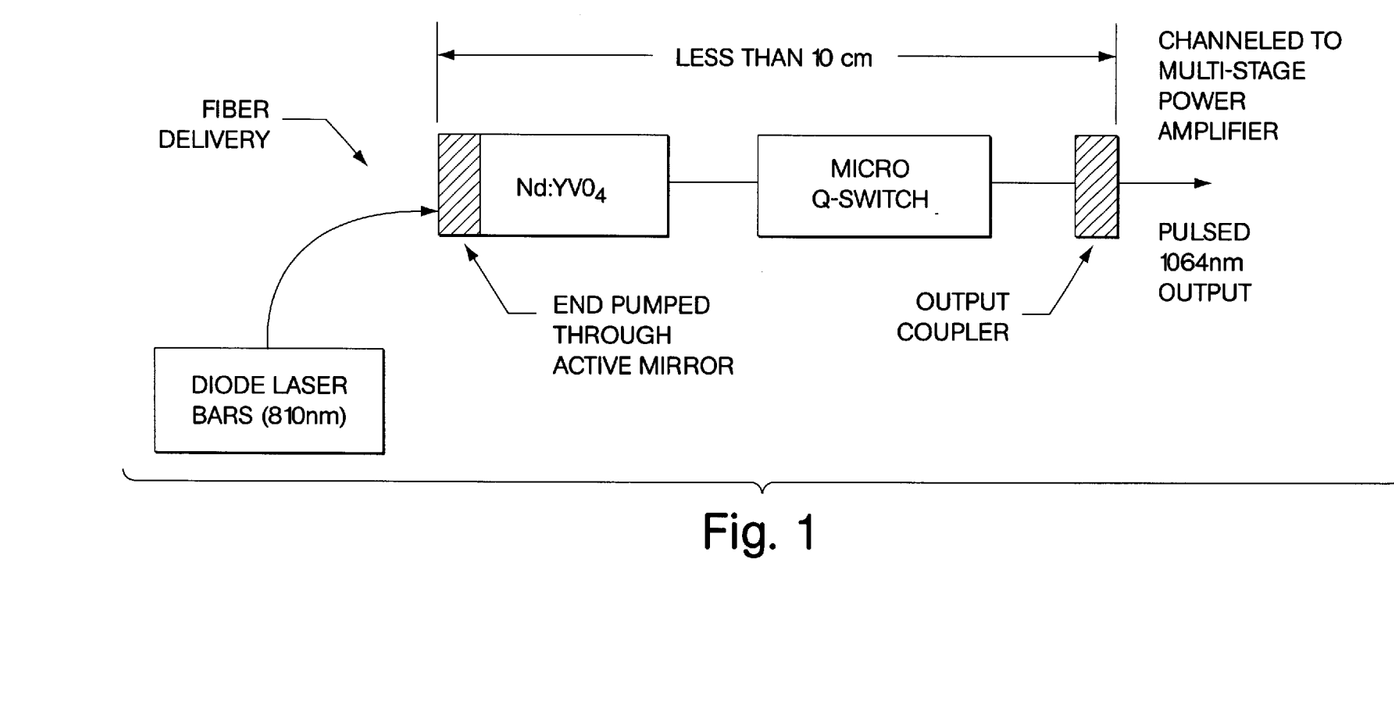
FIG. 1 is a schematic block diagram of a master oscillator used in the light source.

The schematic diagram of the master oscillator is shown in FIG. 1. The primary requirement of the master oscillator is to produce 1064 nm pulsed laser radiation output, which has the pre-determined combination of pulse width (<7 ns) and pulse repetition rate (>40 kHz). The Nd:YVO$_4$ crystal (typical size: 4 mm×4 mm×5 mm) with active mirror will be optically pumped by a cw, fiber-coupled, diode laser bar (average output power ~20 w with peak wavelength ~807 nm) having one end of 500 um diameter fiber fixed within 100 um of the Nd:YVO$_4$ crystal. The pump end of the crystal is polished to function as an active end mirror, or a separate pump mirror may be used to focus the pump bean from the cw, fiber-coupled, diode laser bar. The pulsing of the laser is achieved by micro, acousto-optic or electro-optic Q switch placed in the master oscillator resonator cavity.

The primary requirement of the power amplifier is to gradually amplify the signal wave produced from the master oscillator and increase the average power of the 1064 nm laser radiation. The master oscillator is coupled through output coupler to multiple Nd:YVO$_4$ based gain modules (e.g., power amplifiers), and the average output power increases as more gain modules are added to the master oscillator. Each gain module is constructed from Nd:YVO$_4$ crystal slab transversely pumped by one or two cw diode laser bars (output power ~20 w: peak wavelength ~807 nm). One side of the Nd:YVO$_4$ crystal slab is slightly roughened to suppress parasitic modes within the Nd:YVO$_4$ crystal. In general, Nd:YVO$_4$ crystal has extremely high gain, thus, approximately 50% of optical pumping power from cw diode laser bar can be converted to 1064 nm laser radiation in both master oscillator and power amplifier configurations. The beam divergence of this fundamental laser radiation (1064 nm) is near diffraction limited; therefore, the beam quality is very well suited for non-linear wavelength conversion means and methods to produce the desired R,G,B colors, which are explained in detail below.

Depending upon a set of requirements imposed by the spatial light modulator used for imaging/display application, high pulse repetition rate and/or very short pulse width may not be needed. For these applications Nd:YAG (Neodymium: Yttrium Aluminum Garnet) and/or Nd:YLF (Neodymium: Yttrium Lithium Fluoride) (laser radiation:1047 nm) crystals may be used as alternative laser mediums to Nd:YVO$_4$ for the construction of multi-stage MOPA described above. KTA, KTP, LBO, and BBO are crystals which produce various non-linear frequency conversion to produce desirable red, green and blue wavelengths from 1064 nm or 1047 nm laser radiation. SHG (Second Harmonic Generation), THG (Third Harmonic Generation) and OPO (Optical Parametric Oscillation) are non-linear frequency conversion processes accomplished by these crystals.

Figure 2:
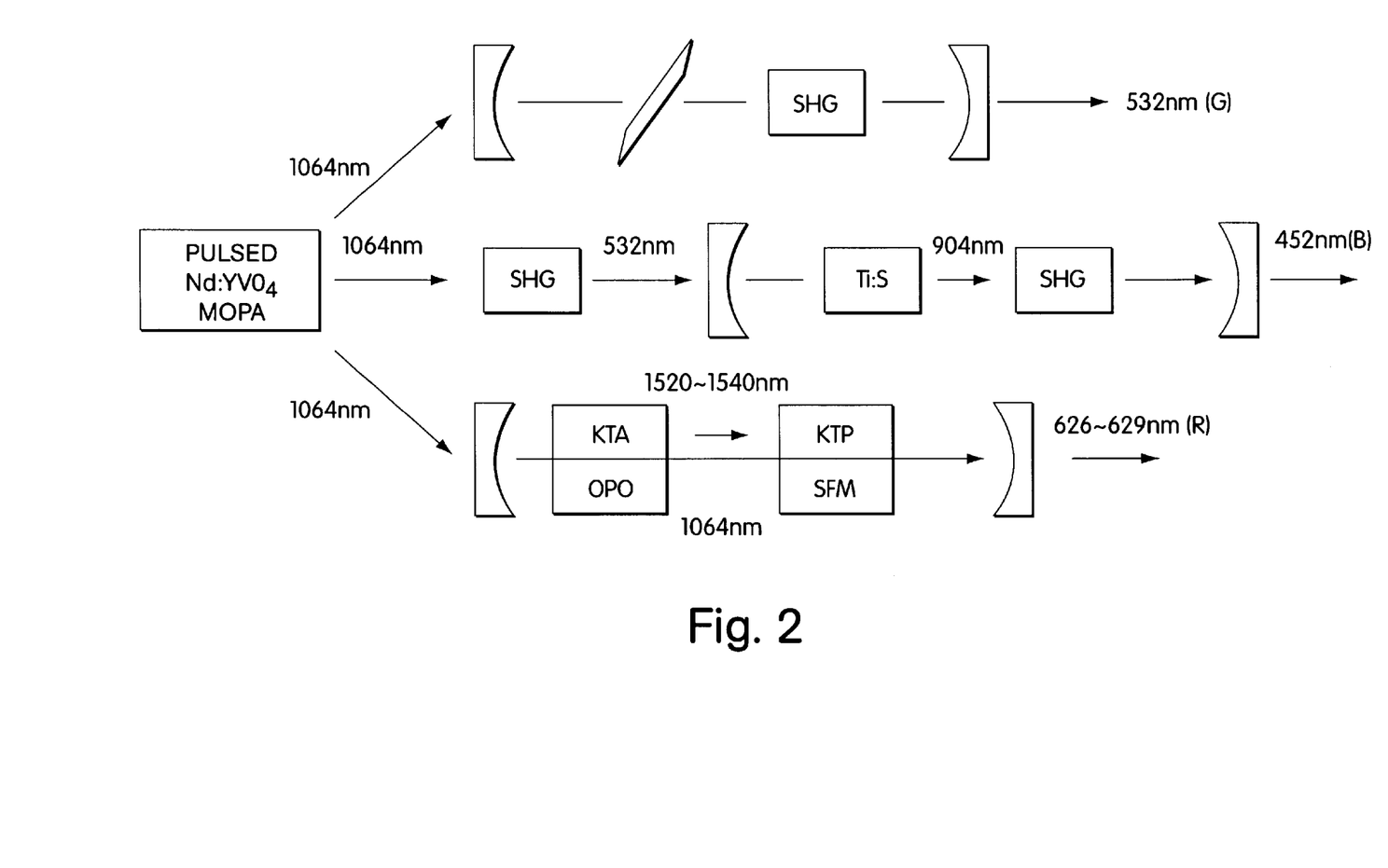
FIG. 2 is a schematic block diagram of the R,G,B laser light source with the master oscillator of FIG. 1.

The schematic block diagram of the monochromatic R,G,B laser light source described is shown in FIG. 2. Approximately 14% of 1064 nm laser radiation from Nd:YVO$_4$ based MOPA is separated from the rest by a beam splitter and frequency doubled to produce green light at 532 nm, which will be used for green (G) light source for the display. 60% Second Harmonic Generation (SHG) efficiency with Type I LBO (Lithium Triborate) or Type II KTP (Potassium Titanyl Phosphate) from the fundamental to the green is an achievable goal, and the SHG cavity is constructed to include an etalon plate to produce etalon induced longitudinal modes, as well as the main TEMO mode. The small amount of this etalon induced longitudinal modes helps increase the spatial incoherency, thus, reduce the speckle effect, and yet maintain near-diffraction limited green beam in transverse direction, which is important to produce bright and crisp images for display applications. Alternatively, the unstable resonator configuration is adopted for the SHG cavity design to generate green (532 nm) from 1064 nm. The unstable resonator configuration generates the multi-mode laser operation in tranverse direction, therefore, the green (532 nm) output produces small amounts of spatial incoherency ($M^2$~10), which also helps reduce the speckle effect.

Approximately half of the remaining 1064 nm laser radiation from Nd:YVO$_4$ based MOPA is frequency doubled by Type I LBO or Type II KTP to produce green (532 nm) light. This green laser light is used to longitudinally pump a Ti:S (Titanium:Sapphire) rod, and infrared emission from Ti:S is tuned to 904 nm by multi-birefringent plate (thickness 1T), then intracavity frequency doubled with Type I BBO (Beta-Barium Borate) or LBO (Lithium Triborate) to produce blue light at 452 nm. A conversion efficiency of 15–20% can be expected from green pump power to blue. The spatial mode of this blue laser is near-diffraction limited. Since Ti:S laser has very broad emission bandwidth in near infrared region (~700–1,000 nm), the blue wavelength can be tunable between 430 nm and 460 nm by selecting different optical coatings and birefringent plate set. This wavelength tuning capability helps create different R,G,B color spaces for various display needs. Nd:YVO$_4$ laser medium has many transition lines, the primary one is 1064 nm and another is 1342 nm. Although this second transition line (1342 nm) is approximately 3 times weaker than the primary one (1064 nm), it can be lased with proper coating modifications. Alternate blue laser design uses Nd:YVO$_4$ based MOPA with laser medium and optics coated for 1342 nm emission. Using Type I LBO crystal to generate 671 nm (SHG of 1342 nm) and additional Type I LBO or Type II KTP to achieve Sum of Frequency Mix (SFM) between 1342 nm and 671 nm results in generation of 447 nm. This process is known as Third Harmonic Generation (THG). Therefore, THG of 1342 nm emission from Nd:YVO$_4$ produces blue wavelength of 447 nm and this blue laser design can be used as the alternate monochromatic light source design for blue wavelength.

Finally, the remaining half of 1064 nm radiation is used to pump the potassium titanyl arsenate (KTA) based intracavity Optical Parametric Oscillation (OPO) and Sum of Frequency Mix (SFM) to produce red in wavelength between 626 nm and 629 nm. When KTA is pumped by 1064 nm, it has been demonstrated to produce the signal (1520 nm ~540 nm) and the idler (~3540 nm) waves, and unlike potassium titanyl phosphate (KTP) the KTA does not exhibit reabsorption of the idler wavelength (~3540 nm), thus, relatively high conversion efficiency (~60%) is expected from KTA based OPO.

A separate Type III KTP will be used to achieve the Sum of Frequency Mix, and it has a phase match angle of 77° for SFM process between the wavelength of 1520 nm ~1540 nm and 1064 nm, producing the resulted red wavelength of between 626 nm and 629 nm with expected SFM conversion efficiency of approximately 30%. This red laser produces near-diffraction limited mode, just like previously discussed blue laser; however, its laser radiation consists of red wavelength of between 626 nm and 629 nm. This slight spectrum incoherency helps reduce the speckle effect. Similarly, Type II KTA or Type I LBO can be used to achieve Sum of Frequency Mix (SFM) between 1520~1540 nm and 1064 nm to produce the desired red wavelength of 626~629 nm, instead of Type III KTP discussed above.

The majority of luminance contribution (~90+%) in white light comes from green and red light portions of the monochromatic R,G,B laser light source. As described above, this monochromatic R,G,B laser light source design consists of green laser which induces spatial incoherency (e.g., multimode structure), and red laser design which produces narrow spectrum incoherency; therefore, the two combined effects minimize the speckle noise.

Figure 3:
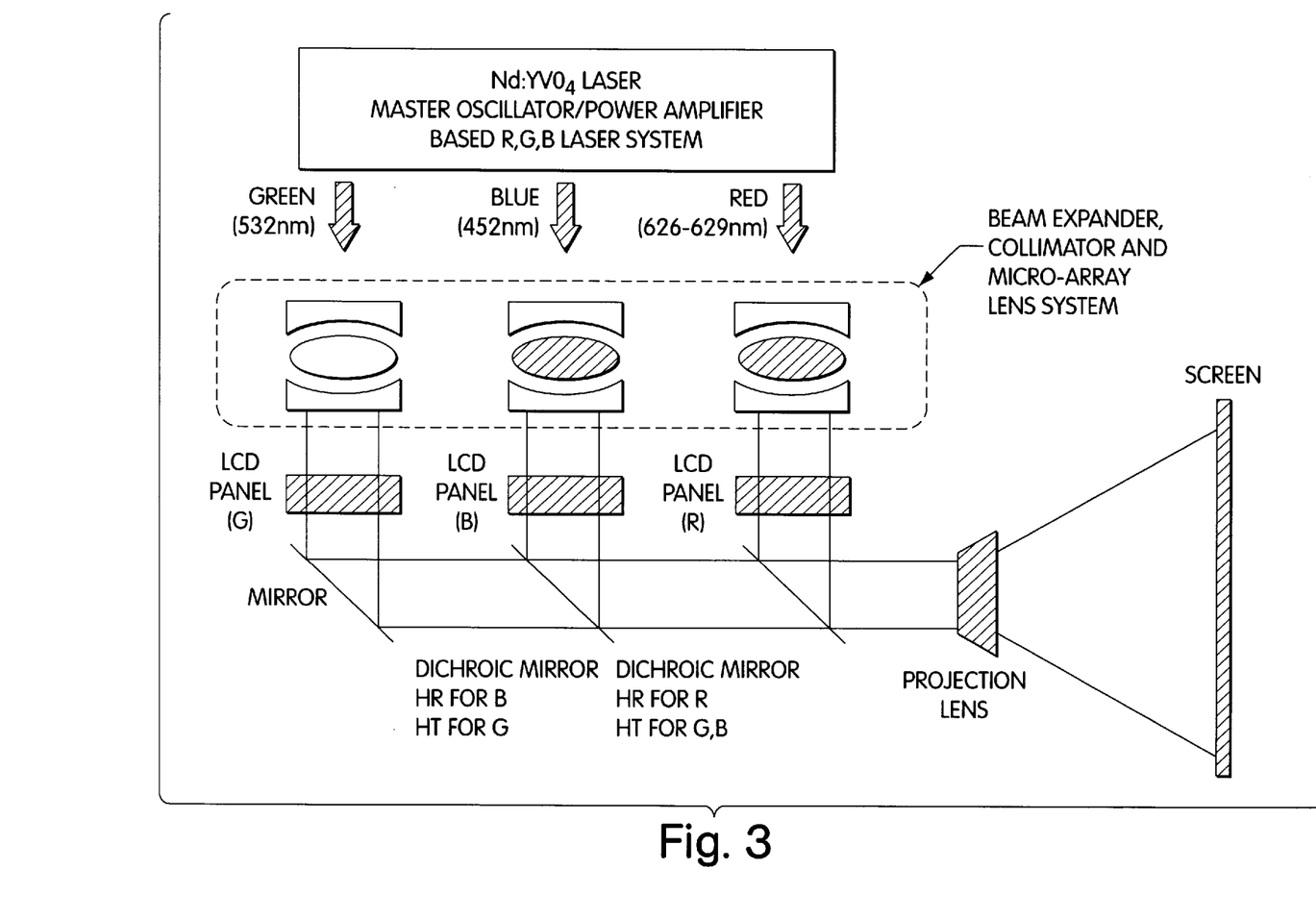
FIG. 3 is a schematic laser light source with three transmissive LCD panels as a LCD display system.

The schematic diagram of the monochromatic R,G,B laser light source coupled with three transmissive LCD panels as the spatial light modulators is shown in FIG. 3. Since LCD panels are totally insensitive to the pulse width modulation, this monochromatic R,G,B laser light source can be coupled with both transmissive and reflective LCD panels acting as spatial light modulators. Especially when the monochromatic R,G,B light source is coupled with the transmissive LCD panel, an exactly same size panel of n×m micro-lens array (n: # of rows of the transmissive LCD panel; m: # of columns of the transmissive LCD panel), and other optics should be added between the monochromatic R,G,B laser light source and the transmissive LCD panel to ensure the highest transmission efficiency of light through the LCD panel, and minimize the effect of diffraction of light caused by the grid structures within the LCD panel. An additional panel of n×m micro-lens array may be used on the opposite side of the LCD panel to re-collimate the transmitted light.

When the choice of spatial light modulator used for imaging or display applications requires cw or quasi-cw light source, this monochromatic R,G,B laser light source can adopt active mode-locking mechanism to produce ultra fast pulse. Active mode-locking by loss modulation is commonly used to generate pulses from lasers with rather limited gain bandwidth such as Nd:YAG lasers. The loss modulation is implemented by using acousto optic modulator driven by an ultra stable RF signal generator. Pulse duration (FWHM) in the range of 80~100 ps are typically achieved. Therefore, constructing the master oscillator with Nd:YAG crystal with active mode-locking mechanism, and constructing the power amplifier with Nd:YAG based laser gain modules will allow the monochromatic R,G,B laser light source to produce ultra fast pulse, thus, operate in quasi-cw mode. This will be very useful as a light source for certain types of spatial light modulators that require the pulse width modulation less than 1 ns.

Figure 4:
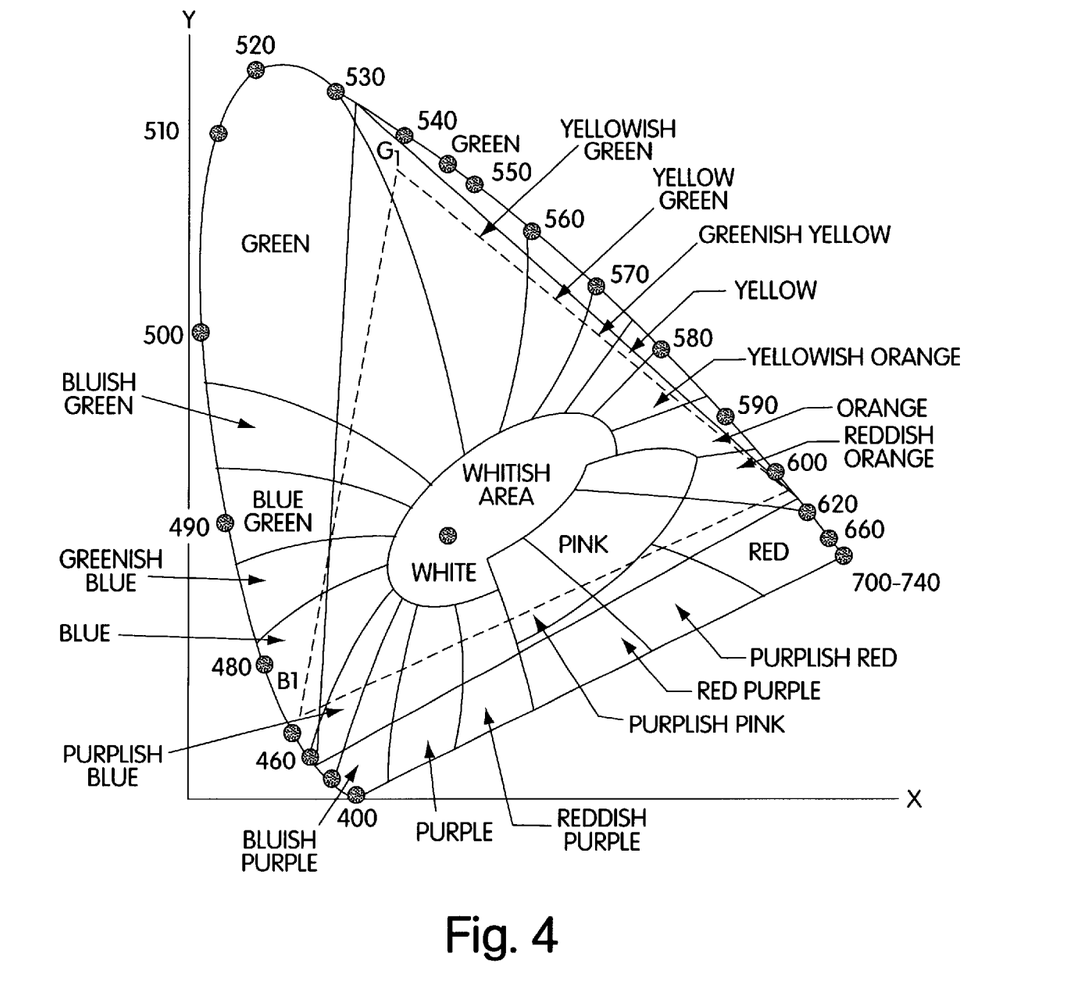
FIG. 4 is a chromaticity diagram (CIE)

The two different color spaces (one defined by NTSC standard and another by the monochromatic R,G,B light source) are shown in FIG. 4. Input signal used for display carries luminance and chromatic (color) information. Most of the existing displays favor the color space defined by NTSC signal standard. This color space is constructed by red (~610 nm), green (~540 nm) and blue (~470 nm). However, the color space defined by the monochromatic R,G,B laser light source is constructed by red (628 nm), green (532 nm) and blue (452 nm).

Figure 5:
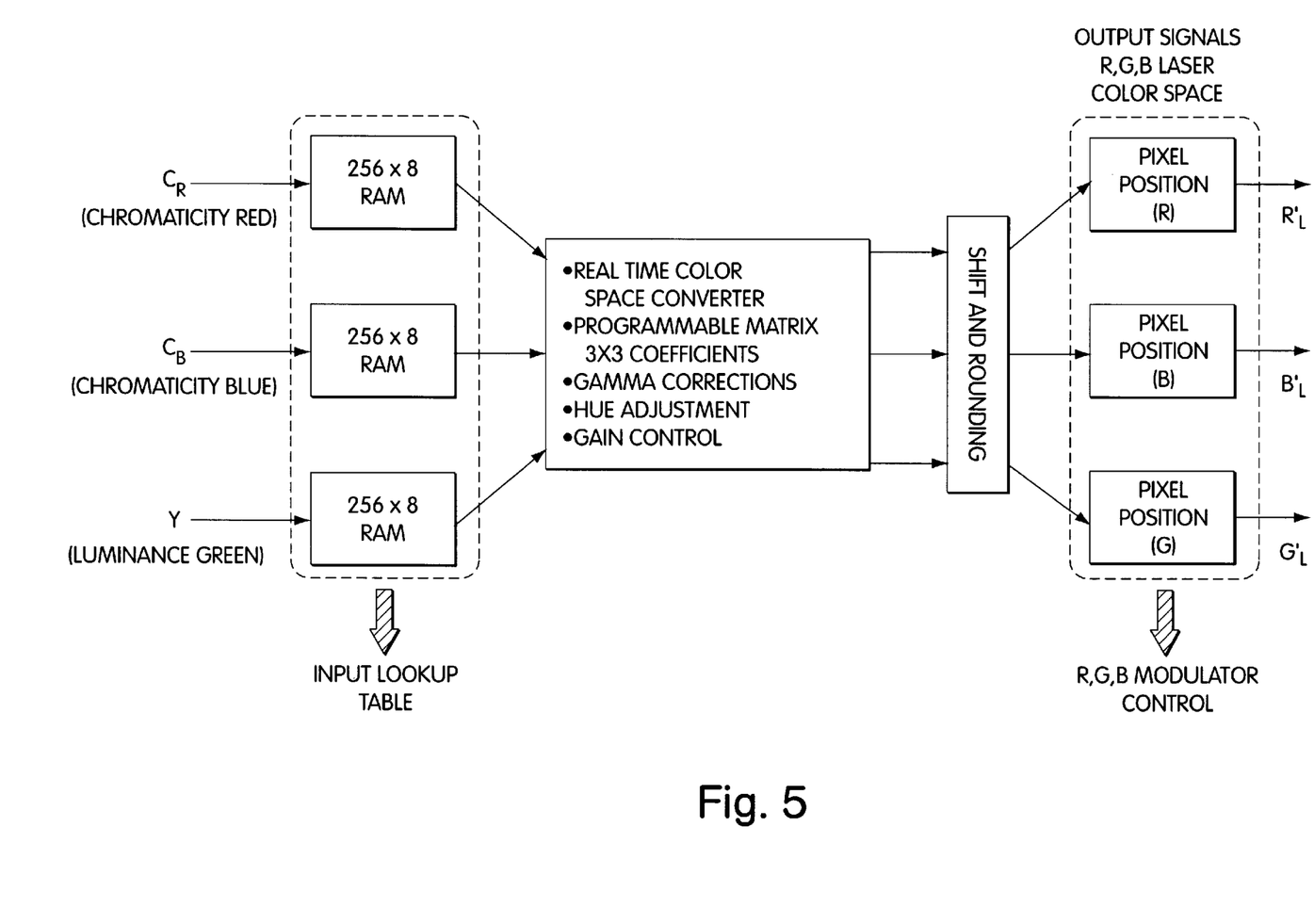
FIG. 5 is a schematic diagram of a digital color space conversion.

The schematic diagram of digital color space converter design discussed below is shown in FIG. 5. In order to duplicate the input signal color space, this monochromatic R,G,B laser light source incorporates the digital electronic circuit design that performs the following:

a. accept separate luminance and chromatic input signals ($C_R$, $C_B$, Y inputs);

b. 24 bits of color information are input through $C_R$, $C_B$ and Y inputs, converted to a new color space (e.g., monochromatic R,G,B laser light source color space) by the 3×3 matrix multiplier in real time basis, and output onto three separate input controls to the spatial light modulator used;

c. three independent 256×8 input lookup tables are used to enable addition or removal of gamma correction, gain control and hue adjustment prior to converting the input signal to another color space;

d. output signals from color space converter may be three-stated asynchronously to CLOCK signal through user defined OE control input;

e. output signals from color space converter may be compressed or expanded in time domain to suit with the operational characteristics of the monochromatic R,G,B laser light source and spatial light modulator used; and f. send trigger signals to the monochromatic R,G,B laser light source synchronous with the operational mode of the spatial light modulator used.

The monochromatic R,G,B laser light source described above can be used as a light source for many different imaging applications, including display applications. Although the specific example of three transmissive LCD panels with the monochromatic R,G,B laser light source has been discussed in detail, the invention can be coupled with other different types of spatial light modulators; such as, but not limited to:

a. reflective LCD panels;

b. any light-valve type spatial light modulators;

c. amplitude-modulated, three acousto-optic, cell-based spatial light modulators, as detailed in U.S. Pat. No. 4,720,747 and 4,851,918;

d. Digital Mirror Device (DMD), two dimensional electro-mechanical, digital, mirror array device modulators, as manufactured by Texas Instruments; and e. electro-mechanical, high speed, optical beam deflector, using piezo-electric devices to deflect and position R,G,B optical beams horizontally onto the screen surface.

What is claimed is:

1. An R,G,B pulsed laser light source with reduced speckle noise adapted for use with a display system, which light source generates R, G and B beams and comprises:

a laser with a laser medium producing a pulsed laser output beam of selected pulse width and wavelength;

an R-channel receiving a first portion of the output beam and generating the R beam, with the R-channel including a resonant cavity with a first nonlinear crystal producing optical radiation having a first wavelength that is greater than the wavelength of the output beam and a spectral width that is greater than a spectral width of the output beam, and a second nonlinear crystal that combines the radiation of the first wavelength with the first portion of the output beam to generate the R beam by sum frequency mixing, said R-beam having a spectral width determined by the spectral width of the optical radiation of the first wavelength;

a G-channel receiving a second portion of the output beam and generating the G beam, with the G-channel including a resonant cavity with a third nonlinear crystal producing second harmonic optical radiation of the output beam, with the cavity of the G-channel further including an etalon that produces a plurality of longitudinal G-channel resonant cavity modes which define a spectral width of the G-channel; and a B-channel receiving a third portion of the output beam and generating the B beam, with the B-channel including a fourth nonlinear crystal that frequency-doubles the third portion of the output beam, and a lasing cavity having a Ti:S laser crystal pumped with the frequency-doubled output beam and producing a lasing wavelength that is twice the wavelength of the B-beam, said lasing wavelength being frequency-doubled by a fifth nonlinear crystal located in the lasing cavity and producing the B-beam;

with the spectral width of the R-channel and the G-channel reducing the speckle noise of the R,G,B pulsed laser light source.

2. The source of claim 1 wherein a pulse rate of the output beam is greater than 40 kHz.

3. The source of claim 1 wherein the laser medium comprises a neodymium-yttrium crystal.

4. The source of claim 1 wherein the G beam has a wavelength of approximately 532 nm or 523.5 nm.

5. The source of claim 1 wherein the R beam has a wavelength of approximately 626 nm to 629 nm.

6. The source of claim 1 wherein the B beam has a wavelength of approximately 452 nm or 447 nm.

7. The source of claim 1 wherein the laser comprises:
a) a neodymium-yttrium vanadate laser medium with a pump end with an active mirror;
b) a diode laser bar with output wavelength of 807 nm;
c) an optical fiber means to deliver the diode laser bar output to the pump end of the laser medium;
d) a Q-switch means to pulse the laser beam from the laser medium; and
e) an output beam coupler to transmit a pulsed laser beam.

8. The source of claim 1 wherein the laser comprises:
a) a neodymium-yttrium vanadate laser medium;
b) a single or multiple diode laser bar with an output wavelength of 807 nm;
c) means to focus the diode laser bar output to one or both sides of the laser medium;
d) a Q-switch means to pulse the laser beam from the laser medium; and
e) an end mirror and an output beam coupler to resonate and transmit a pulsed laser beam.

9. The source of claim 1 wherein the output laser beam wavelength is 1047 nm or 1064 nm.

10. The source of claim 1, further including:
means to divide the output signal into the three separate portions of the output beams.

11. The source of claim 1 which includes active modelock means to produce quasi-cw operation of the R,G,B laser light source.

12. The source of claim 1, further including a laser power amplifier means to amplify the power of the output beam.

13. The source of claim 1, wherein the first nonlinear crystal comprises a potassium titanyl arsenate (KTA) and the second nonlinear crystal is selected from the group consisting of KTA or lithium triborate (LBO).

14. A color image video display system comprising:
an R,G,B pulsed laser light source with reduced speckle noise, which light source generates R, G and B beams and includes a laser with a laser medium producing a pulsed laser output beam of selected pulse width and wavelength;

an R-channel receiving a first portion of the output beam and generating the R beam, with the R-channel including a resonant cavity with a first nonlinear crystal producing optical radiation having a first wavelength that is greater than the wavelength of the output beam and a spectral width that is greater than a spectral width of the output beam, and a second nonlinear crystal that combines the radiation of the first wavelength with the first portion of the output beam to generate the R beam by sum frequency mixing, said R-beam having a spectral width determined by the spectral width of the optical radiation of the first wavelength;

a G-channel receiving a second portion of the output beam and generating the G beam, with the G-channel including a resonant cavity with a third nonlinear crystal producing second harmonic optical radiation of the output beam, with the cavity of the G-channel further including an etalon that produces a plurality of longitudinal G-channel resonant cavity modes which define a spectral width of the G-channel; and a B-channel receiving a third portion of the output beam and generating the B beam, with the B-channel including a fourth nonlinear crystal that frequency-doubles the third portion of the output beam, and a lasing cavity having a Ti:S laser crystal pumped with the frequency-doubled output beam and producing a lasing wavelength that is twice the wavelength of the B-beam, said lasing wavelength being frequency-doubled by a fifth nonlinear crystal located in the lasing cavity and producing the B-beam.

15. The system of claim 14, further comprising three LCD panels, each panel optically and electronically coupled with one of the R,G,B beams to provide a full color LCD display system.

16. The system of claim 13, further comprising:
a first optical means to receive and shape the R,G,B beams;
a spatial light modulator means to receive the R,G,B beams from the optical means, and to modulate the R,G,B beams to produce a full color video image;
electronic means to operate the spatial light modulator means; and
a second optical means to relay, combine, and project a full color video image on a screen.

17. The system of claim 16 wherein the spatial light modulator means comprises three transmissive or reflective LCD panels, one for each R,G,B beam.

18. The system of claim 16 wherein the first optical means includes expander, collimator and micro-array lens means to receive the R,G,B beams and to increase the R,G,B light transmission efficiency and minimize diffraction.

19. The system of claim 16 wherein the spatial light modulator means comprise three transmissive LCD panels, one for each R,G,B beam, and which system includes:
   a) a first optical means which comprises a beam expander, collimator and micro-array lens means to expand, to collimate, and to increase transmission efficiency of the R,G,B beams from the light source and incident on the LCD panels;
   b) a second optical means which comprises an optical means to re-collimate the R,G,B beams on the opposite side of the LCD panels; and
   c) projection means to project the re-collimated R,G,B beams onto a screen.

20. The system of claim 16 wherein the electronic means includes digital color space conversion means to translate electronic input video chromatic signals into electronic signals within R,G,B laser color space.

21. The system of claim 16 wherein the output laser beam wavelength is 1047 nm, 1064 nm or 1342 nm.

22. A method of producing a pulsed laser R, G, B light source of reduced speckle noise useful in a full color display system, which method comprises:
   a) providing a pulsed laser output beam;
   b) generating by crystal-based, non-linear frequency conversion, a G beam with spatial incoherency, by multi-longitudinal mode operation produced by an etalon located in a G-channel cavity, from the output beam;
   c) generating, by optically pumping a Ti:S laser crystal with frequency-doubled output beam radiation to produce an intermediate lasing wavelength and crystal-based, intra-cavity non-linear frequency conversion of the intermediate lasing wavelength, a B beam from the output beam;
   d) generating from the output beam, by crystal-based, non-linear frequency conversion, an intermediate beam having a spectral width substantially greater than a spectral width of the output beam and a wavelength longer than the wavelength of the output beam, and subsequent crystal-based, non-linear sum frequency mixing of the intermediate beam with the output beam an R beam with a spectral width determined by the spectral width of the intermediate beam; and
   e) mixing the generated R,G and B beams to provide a full color beam with reduced speckle noise.

23. The method of claim 22, wherein the mixed full color beam produces a well color balanced, white laser light source.

24. The method of claim 22, further including modulating an intensity of the R, G, B beams and projecting the modulated beams on a projection screen to provide a full color video image.

25. The method of claim 22 wherein the output beam wavelength is a 1047 nm, 1064 nm or 1342 nm.

26. The method of claim 22 which includes generating an R beam of 626–629 nm, a G beam of 532 nm or 523.5 nm, and a B beam of 452 nm or 447 nm.

27. The method of claim 22, further including:
   a) amplifying the pulsed laser output beam by a power amplifier means having a neodymium-yttrium vanadate laser medium; and
   b) side-pumping the neodymium-yttrium vanadate laser medium with a single or multiple diode laser bar.

28. The method of claim 22 which includes generating the output laser beam at a wavelength of 1047 nm or 1064 nm.

* * * * *